United States Patent
Ratermann

(10) Patent No.: US 10,817,835 B2
(45) Date of Patent: Oct. 27, 2020

(54) TANK SENSOR ARRAY FOR INVENTORY SIGNALING IN A TANK MANAGEMENT SYSTEM

(71) Applicant: Ratermann Manufacturing, Inc., Livermore, CA (US)

(72) Inventor: George W. Ratermann, Livermore, CA (US)

(73) Assignee: Ratermann Manufacturing, Inc., Livermore, CA (US)

( * ) Notice: Subject to any disclaimer, the term of this patent is extended or adjusted under 35 U.S.C. 154(b) by 327 days.

(21) Appl. No.: 15/882,871

(22) Filed: Jan. 29, 2018

(65) Prior Publication Data

US 2018/0197138 A1 Jul. 12, 2018

Related U.S. Application Data

(63) Continuation-in-part of application No. 14/509,532, filed on Oct. 8, 2014, now Pat. No. 9,880,320, and a continuation-in-part of application No. 15/494,250, filed on Apr. 21, 2017.

(51) Int. Cl.
*G06Q 10/08* (2012.01)
*H04L 29/08* (2006.01)

(52) U.S. Cl.
CPC ............ *G06Q 10/087* (2013.01); *H04L 67/12* (2013.01)

(58) Field of Classification Search
CPC .............................. G06Q 10/087; H04L 67/12
See application file for complete search history.

(56) References Cited

U.S. PATENT DOCUMENTS

| | | | |
|---|---|---|---|
| 4,419,734 A | 12/1983 | Wolfson et al. | |
| 5,096,006 A * | 3/1992 | Howard | F17C 1/007 177/134 |
| 5,265,032 A * | 11/1993 | Patel | F17C 13/021 379/106.06 |
| 5,671,362 A | 9/1997 | Cowe et al. | |
| 6,553,128 B1 | 4/2003 | Jouvaud | |
| 6,761,194 B1 | 7/2004 | Blong | |
| 7,233,241 B2 | 6/2007 | Overhultz et al. | |
| 8,159,358 B2 * | 4/2012 | van Schie | B65D 90/50 116/109 |
| 9,275,361 B2 | 3/2016 | Meyer | |
| 9,880,320 B2 | 1/2018 | Ratermann | |

(Continued)

OTHER PUBLICATIONS

Printout: USPTO Final Office Action dated Jun. 5, 2009 for U.S. Appl. No. 12/006,797, filed Jan. 4, 2008 of Gordon W. Hill, 30 pages.

*Primary Examiner* — Mohamed Charioui
(74) *Attorney, Agent, or Firm* — Thomas Schneck

(57) ABSTRACT

A tank inventory signaling apparatus that has gas cylinder tanks stored in an array at a tank farm. The gas cylinder tanks are placed where weight sensors detect whether a tank of the array is substantially full or not, say greater than 75% full. The substantially full tanks form the tank inventory at a tank farm that is transmitted to a networked local server. The information is relayed to a remote server having tank management software that orders replacement gas cylinders. A threshold level can be set in the inventory for order generation for all non-substantially full tanks in the array with the order generated at the remote server when the inventory drops below the threshold at a local server.

19 Claims, 4 Drawing Sheets

(56) References Cited

U.S. PATENT DOCUMENTS

| | | | |
|---|---|---|---|
| 2005/0139468 A1* | 6/2005 | Rao | G01N 27/4175 |
| | | | 204/401 |
| 2005/0171854 A1* | 8/2005 | Lyon | G01G 19/4144 |
| | | | 705/24 |
| 2007/0050271 A1* | 3/2007 | Ufford | G06Q 10/087 |
| | | | 705/28 |
| 2008/0183599 A1* | 7/2008 | Hill | G06Q 10/087 |
| | | | 705/28 |

* cited by examiner

TANK SENSOR ARRAY FOR INVENTORY SIGNALING IN A TANK MANAGEMENT SYSTEM

CROSS-REFERENCE TO RELATED APPLICATIONS

This application is a continuation-in-part of application Ser. No. 14/509,532 filed Oct. 8, 2014; now U.S. Pat. No. 9,880,320 issued Jan. 30, 2018; and a continuation-in-part of application Ser. No. 15/494,250 filed on Apr. 21, 2017.

TECHNICAL FIELD

The invention relates to gas cylinder tank inventory signaling from a storage location to a remote server in a tank inventory and ordering system.

BACKGROUND ART

Industrial concerns, such as hospitals, welding shops, chemical processing plants and similar businesses, use a large number of cylinders or tanks of industrial gases. Cylinders are delivered to such concerns in full condition and picked up after use. The cylinders are heavy, expensive and must be carefully stored. Methods for distribution and inventory control have been a subject of much research over the years. For example, see the paper in Interfaces 13, 6 Dec. 1983, p. 4-23 entitled "Improving the Distribution of Industrial Gages with an On-Line Computerized Routing and Scheduling Optimizer" by W. J. Bell et al. The article describes the efforts of Air Products and Chemicals, Inc. to implement industrial gas cylinder inventory management at customer locations with delivery vehicle scheduling. A sophisticated software algorithm for the project is described. An essential part of the gas cylinder management problem is for a distributor to know the present inventory of full and empty tanks at a concern or customer distant from the distributor. Usually a customer is responsible for inventory status and different customers have different approaches.

In U.S. Pat. No. 7,619,523 to F. Durtschi et al. describe "Gas Cylinders Monitoring by Wireless Tags". In this system, each gas cylinder includes a RDID transponder configured to transmit a RFID signal received by a RFID receiver connected to a server. The gas cylinder data received by the server is collected in a database and thereafter used by a gas cylinder management software application. Published Patent Application 2011/0140850 describes a transport cap for gas cylinders where the cap supports RFID devices for gas cylinder tracking. A generic tank monitoring system is disclosed in U.S. Pat. No. 7,304,588 to D. Ingalsbe et al. In published U.S. Patent Application 2014/0163727 Y. Siaamer et al. describe a gas cylinder management system where tanks are identified by optically sensing the color markings of a tank or for detecting ferromagnetic material identifiers. In U.S. Pat. No. 5,505,473 F. Radcliffe discloses a mobile cart with shelves with radio communication of inventory on the shelves. A scanner can identify the inventory and communicates with a terminal regarding the location identifiers.

An object of the invention is to monitor use of tank cylinders at end user locations and report tank inventory to a tank cylinder ordering and delivery management system.

SUMMARY

One of the inputs for a tank cylinder order and delivery management system for industrial gas cylinders comes from a tank farm where tanks are stored prior to use. The present invention contemplates a tank array at a tank farm that has tank weight sensors at tank localizers where tanks are stored so that the weight sensors can detect whether gas cylinder tanks are substantially full or not. The tank localizers assure that gas cylinder tanks are in proximity to weight sensors. In any case, the weight sensors generate two logic signals representing two logic states indicating a substantially full tank and a tank that is not. The signaling system of a tank farm storage unit reports logic signals representing substantially full tanks to a local server that maintains a database of substantially full tanks in the array, i.e. an inventory. The multiple sensors are networked to the local server so that an initial state of all sensors can be established. A plurality of local servers is connected via the Internet or otherwise to a remote server that is associated with a system having tank management and supply software and route management software. The remote server tracks tank usage from the tank storage units and orders replacement tanks when tank inventory is below a preset threshold and optimizes delivery of replacement tanks. The remote server can display tank management information via a website or a smart phone app.

DETAILED DESCRIPTION

Figure 1:
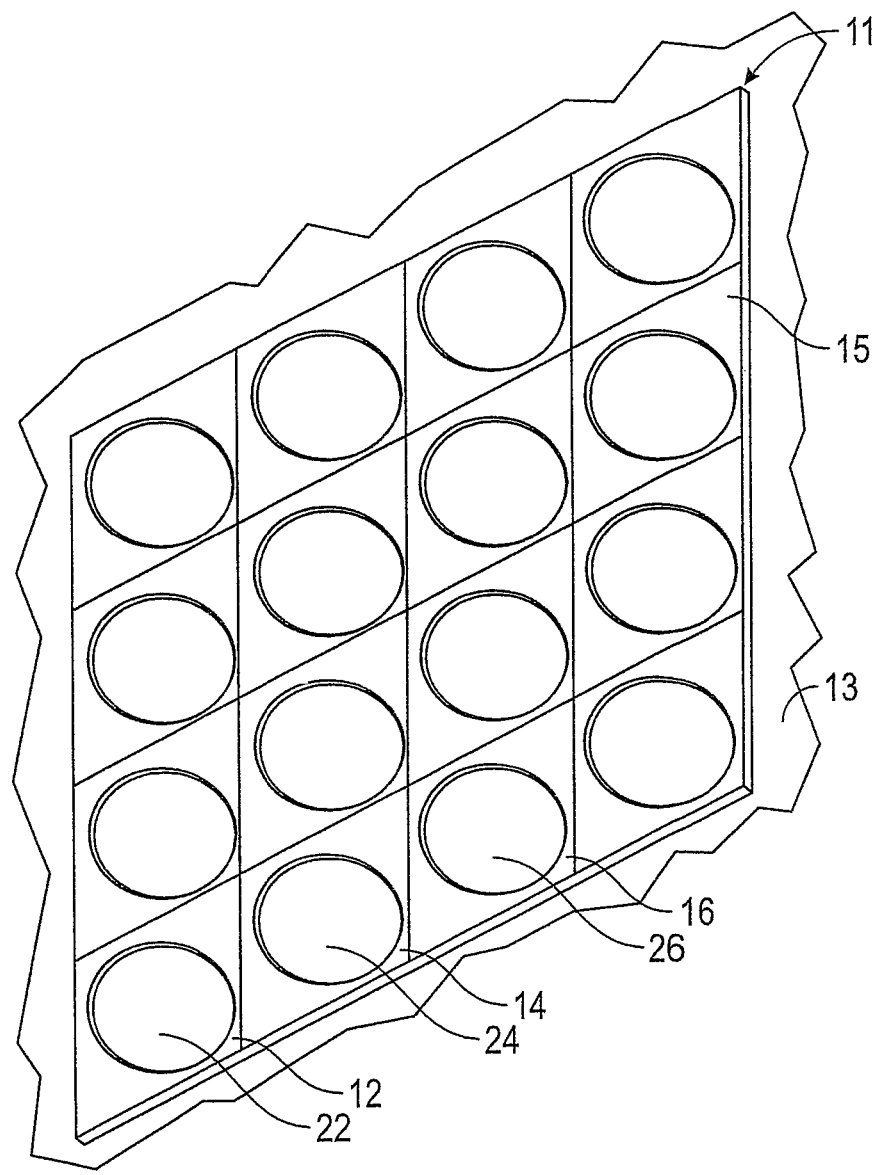
FIG. 1 is a perspective plan view of a tank storage array for upright gas cylinder tanks in one embodiment of the invention.

With reference to FIG. 1, a tank storage localizer, such as a sheet 11, formed, for example, of thin plywood or non-rigid material on top of rigid material, is shown having an optional visually perceptible array of squares 15 with individual squares 12, 14, 16, all associated with tank storage positions with adjacent underlying weight sensors, not shown. The storage sheet 11 is placed on a rigid floor 13 that is a tank farm for an array of gas cylinders at a storage location.

Figure 2:
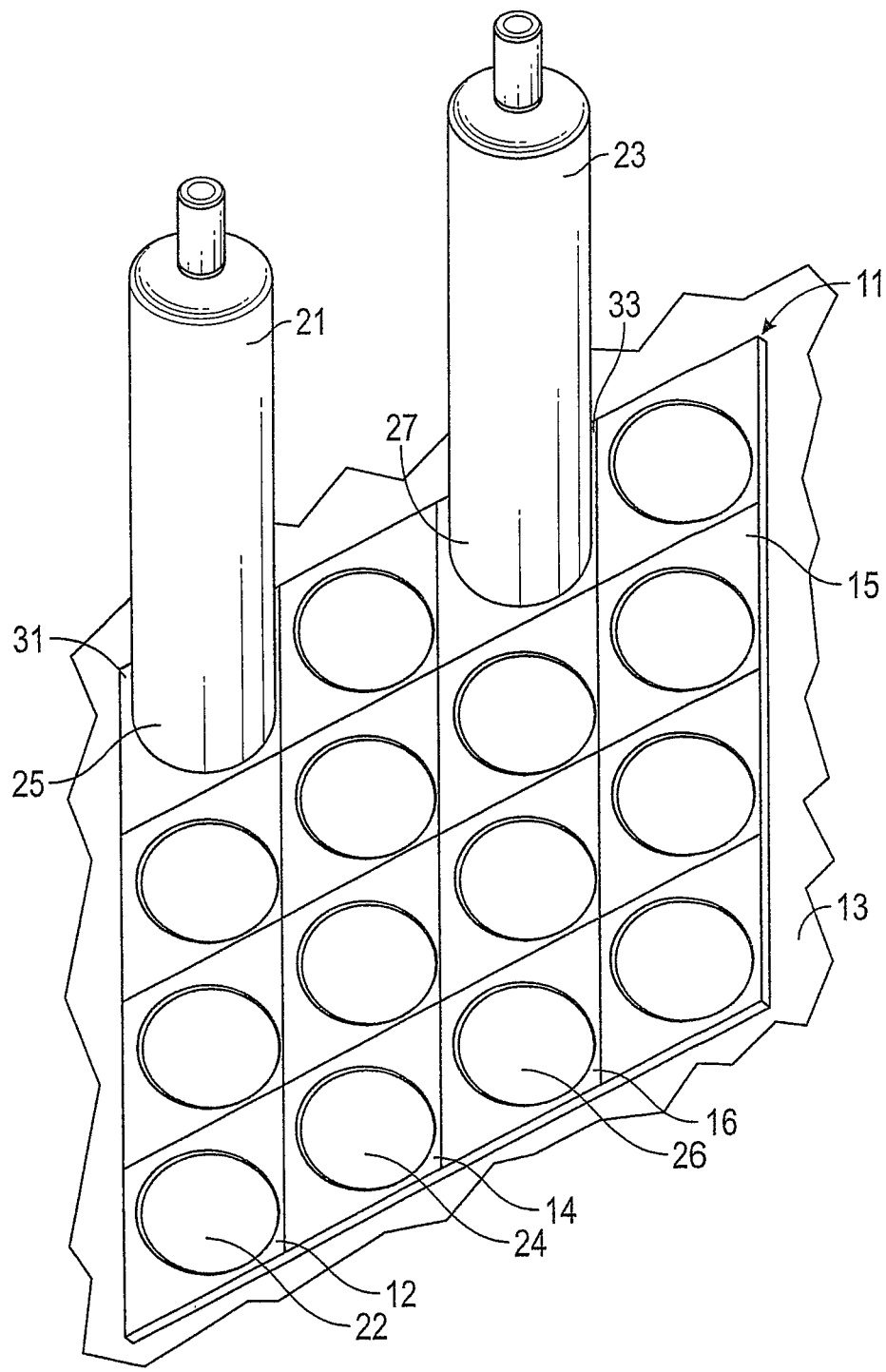
FIG. 2 is a perspective plan view of the tank array of FIG. 1 with upright gas cylinder tanks in storage locations.

As an example of gas cylinder tank localizers with associated weight sensors for a tank array consider the array of squares 15 on sheet 11, shown in FIGS. 1 and 2. The sheet has marked circles or spots 22, 24, 26 for visually locating bases of upright gas storage tanks. The array of squares 15 on sheet 11 need not be visually perceptible in all cases but the circles or spots 22, 24, 26 are helpfully visually perceptible in order to indicate tank placement. Robotic non-visual placement can be substituted for visual placement. The array of squares is an allocation of physical tank storage space, with each square large enough to situate or localize the base or bottom of a gas storage tank without contacting adjacent tanks that could influence a weight measurement. A spot may be any geometric figure that indicates a grid square. For example, spots maybe triangles, X's, ovals or even squares, with preferably each spot being in a grid square. The array has parallel rows where gas cylinders of the same type are stored. For example, one row may be oxygen cylinders, the next row nitrogen cylinders and then next row carbon dioxide cylinders, and so on. Gas cylinders of the same type are maintained in rows for safety and convenience in placement, reordering and delivery. The mapping of storage locations is part of the initial array information that is communicated by a user to a local server to a remote server as described below.

Each spot localizes or indicates the location of a tank weight sensor in the sheet or beneath the sheet. The sensor may be a spring sensor or a piezo sensor that senses tank weight and having two states. When a tank is placed on the spot, the sensor detects a tank weight. The sensors are calibrated for a specific type of gas cylinder and generate a first electrical signal, i.e. a logic signal, when the tank is substantially full, e.g. within 75% of maximum weight when filled with the specific gas intended for the tank. For example, a full tank of propane might weigh 35 pounds when full or 33 pounds when within 75% of maximum gas weight and 25 pounds when empty, i.e. the weight of the propane is 10 pounds maximum. In this situation, the weight sensor produces a first logic signal when the tank weight is 33 pounds or above and a second logic signal when the tank weight is below 33 pounds.

With reference to FIG. 2, substantially full gas cylinder tanks 21 and 23 have been placed on spots 25 and 27 in the square locations 31 and 33, respectively. Beneath each tank, a sensor senses the weight of the tank and signals the presence of a substantially full tank with a first logic signal, while other sensors of the array, having no gas cylinders thereon, sense the opposite, i.e. no substantially full tank, and produce a second logic signal.

In FIG. 2, the tank localizer spots 22, 24, 26, etc. are directly over the weight sensors, now shown. The localizer spots are target storage locations for gas cylinder tanks and correspond to spots 22, 24, 26, etc. in FIG. 1. The sheet material carrying the spots may be rigid or non-rigid. For example, canvas or even sheet cardboard may be used when placed on concrete flooring. Opposing contacts of sensors are adhered to tank support members so that weight is measured in a vertical direction corresponding to gravitational force. An array of spots may serve to localize gas cylinders using the sensor grid associated with the spots for signaling tank weight at the tank storage locations. While circular spots are contemplated for tanks that are stored vertically, oblong spots or sensors incorporated in rails, as described below, could be used for tanks stored horizontally, so long as weight sensors can accurately measure whether a gas cylinder tank is substantially full or not. Tanks that are stored horizontally may require a plurality of weight sensors that are coupled to work together to obtain an accurate tank weight.

The dimension of each square that situates a spot exceeds the width of an upright gas cylinder tank by a slight amount such that an array of tanks may be aligned on storage sheet 11 as shown in FIG. 1.

When gas cylinders tanks are placed on the spots in an upright manner, the sensors are activated and read. Reading of the sensors is periodic, such as every few minutes. When a tank is removed, or gas is removed from a tank in place, the associated sensor will signal a change in the state of the array because the first logic state associated with a substantially full tank at a specified storage location may have changed to a second state. The initial state of the array is recorded at a local server and reported to a remote server, together with the gas cylinder tank storage map, previously described. Then changes in the array are measured as tanks are removed or gas is removed from a tank such that a partially empty tank is not counted as substantially full. The changes are also reported to the remote server.

Tank localizing for weight sensing need not be associated with spots on a sheet. Sometimes tanks can be stored horizontally on parallel rails. For example, in FIG. 3 a propane cylinder 32 is supported and localized by a pair of spaced-apart L-shaped rails 34 and 36 that may be part of a rack, such as rack 40, shown in FIG. 4. The rack has an X-Y vertical array of storage locations with the bottom of each location established by spaced apart rails, with at least one rail incorporating a weight sensor. Rack 40 has a plurality of rails similar to rails 34 and 36, such as rails 42, 44 and 46, 48, and so on. The parallel rails incorporate a weight sensor, as shown in FIG. 5. In FIG. 5, rail 34 is seen to have an upper rail body 52 that is fastened or connected to a lower rail body 54 by a pin 56. Between the two rail bodies is a calibrated tank weight sensor 58.

Figure 3:
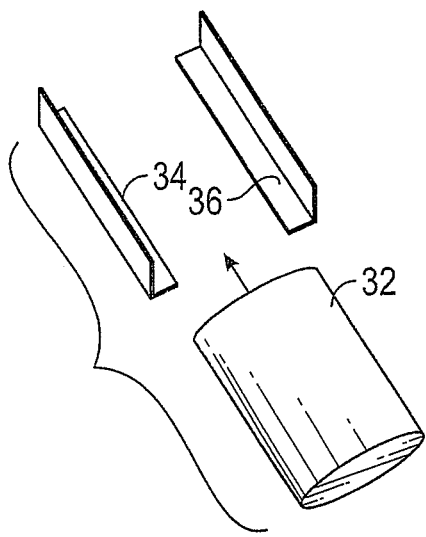
FIG. 3 is a perspective plan view of a portion of a storage array for non-upright gas cylinder tanks using parallel rails for tank support in another embodiment of the invention.
Figure 4:
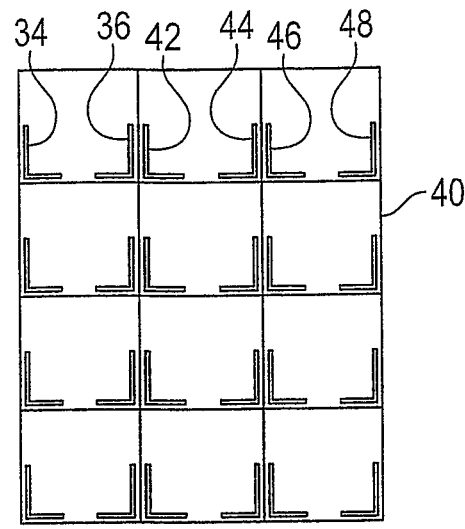
FIG. 4 is a front plan view of a storage array with rails as shown in FIG. 3.
Figure 5:
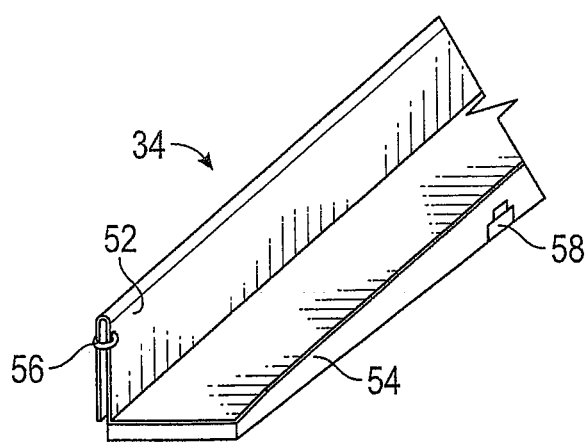
FIG. 5 is a cutaway perspective plan view of construction details for one of the two rails shown in FIG. 3.

A gas cylinder tank, such as the propane cylinder 32 of FIG. 3, can be localized or stored in a rack, such as upright rack 40 of FIG. 4. Upper and lower rail bodies 52 and 54 are nesting relative to each other and are forced toward each other with force exerted on the calibrated tank weight sensor 58 that produces a first logic signal in the case of a substantial full tank and a second logic signal otherwise. In this manner, a local server can detect the inventory of substantially full tanks in an array of tanks. A weight sensor with an upright spring between rail bodies may also provide a visual indication of a full tank in contrast to an empty tank upon inspection of the rail body inclination.

Figure 6:
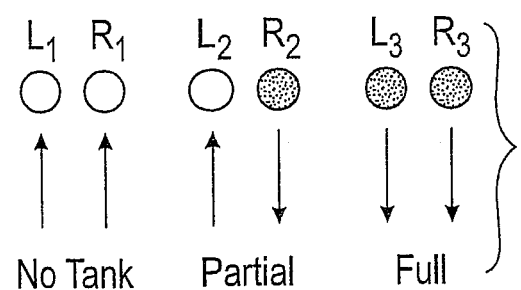
FIG. 6 is a diagram of switch states for two rails, as in FIG. 3, each constructed as in FIG. 5.

In FIG. 6 logic states for one pair of weight sensing switches acting as a tank weight sensor in tandem for left and right rails are shown. A weight sensing switch is an electromechanical device that detects a calibrated amount of compressive force to change on-off state and generate a corresponding electrical signal. The two switches operating in tandem, respond differently to different weight loads on both rails. The right switch, R, is more sensitive to loads than the left switch, L, as established by calibration. The left switch responds only to a substantially full tank on both rails. The right switch for the right rail is calibrated to signal a less than substantially full tank. The left switch for the left rail is calibrated to signal a substantially full tank. When no tank is present, both switches are up or open, indicated by two white dots L1, R1. A less than substantially full tank on the rails will cause switch R2 to be down but L2 is up, indicated by dark dot R2 and white dot L2. A substantially full tank on the rails will cause switch R3 and L3 to be down. As before, the sensing of a substantially full tank produces a first logic signal and a second logic signal otherwise.

Figure 7:
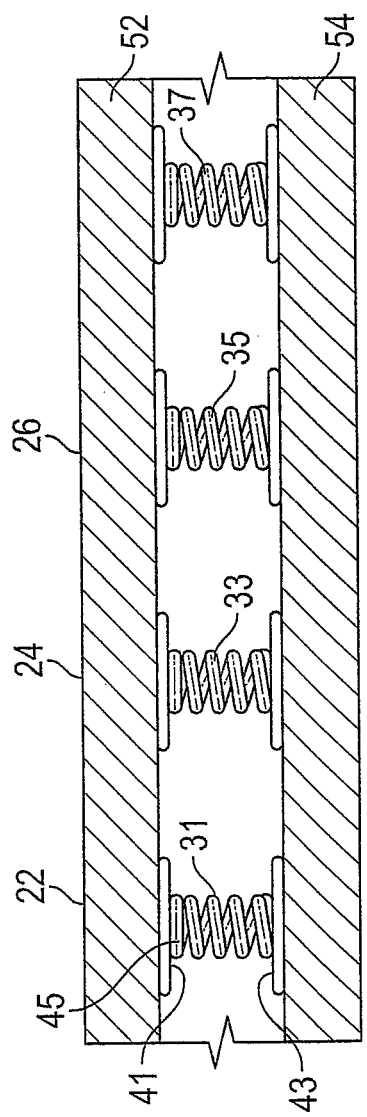
FIG. 7 is a side plan view of a portion of a tank weight sensor for use in the embodiment of the invention shown in FIG. 3.

With reference to FIG. 7, a portion of a tank weight sensor is shown that may be used in one of the tank localizers described above, such as the sheet encapsulating an array of sensors described in FIG. 1, or the upper and lower rail bodies of FIG. 5. The localizer has a first tank support member 52 separated from a second similar support member 54 having spaced apart weight sensors 31, 33, 35, 37 therebetween. Each sensor is shown having a compressive spring between spaced apart planar force transducer contacts, such as contacts 41 and 43. The weight sensors can be connected in parallel, similar to parallel resistors, such that an average weight value is read from the multiple parallel sensors. Separating the contacts is a spring, such as helical spring 45, having a diameter less than the diameter of the spaced apart planar contacts. When a tank is placed on the localizer, atop a spring or other weight sensor, the weight sensor generates an electrical logic signal, a digital one or zero, corresponding to pre-calibrated tank weight, i.e. substantially full or not. If a tank is substantially full, a first logic signal is generated by the transducer and, if not, a second logic signal is the default signal that is over-ridden by the first logic signal. When a tank is removed from its position, the transducer reverts to the second default logic signal if not already in that state. While the transducer is shown as a spring that transfers force to a force transducer, such as a piezoelectric transducer, another construction employs a piezo transducer alone, without any spring. Other transducers such as capacitive sensors, without springs, will also work with proper calibration. Prior to use, the transducer is calibrated so that the electrical output signal matches a threshold value indicative of a substantially full tank. The word "substantially" is defined by a user at calibration time and in this application is selected to be 75% of the weight of a full tank, but another value could be selected at calibration time.

Figure 8:
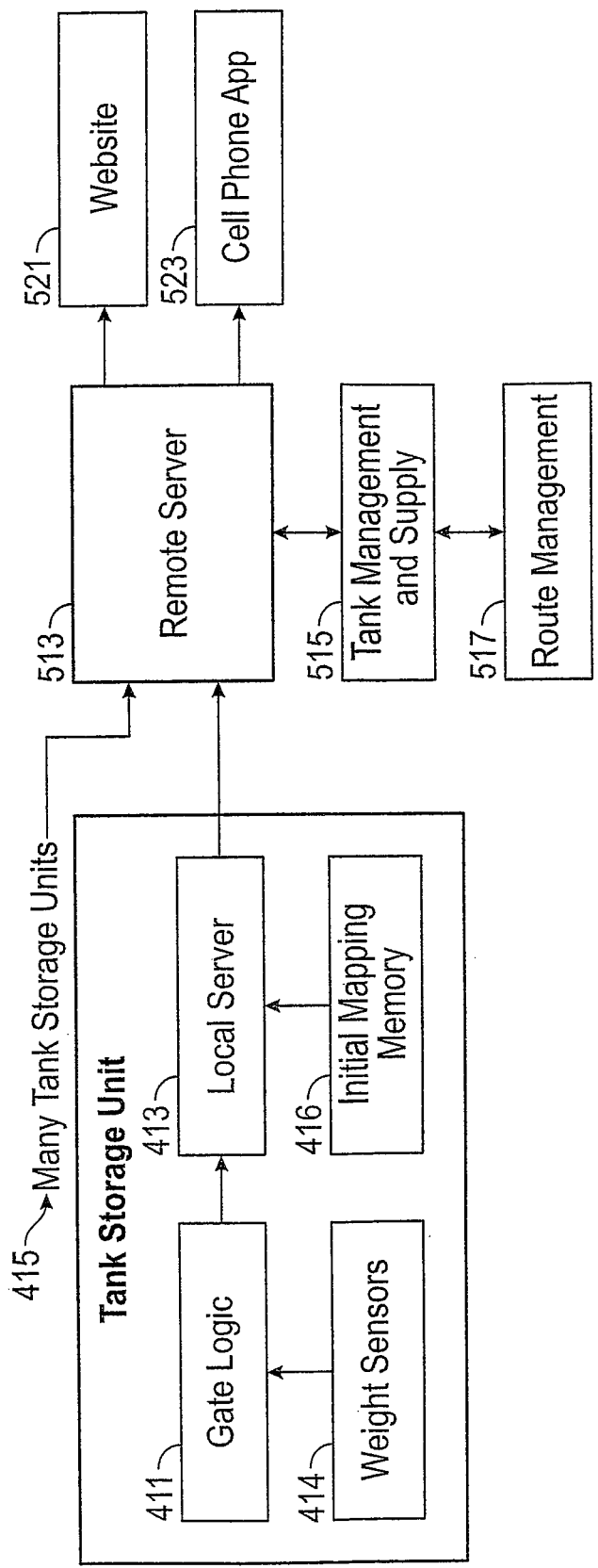
FIG. 8 is an electrical plan of a tank inventory signaling system in accordance with the invention.

The initial state of the sensor array is set in gate logic 411, seen in FIG. 8. Gate logic 411 consists of memory or FPGAs that monitor changes in the initial state to the next state, and so on. This requires that each weight sensor 414 be connected to the gate logic 411 where the logic state of the sensor is read and temporarily stored. When a sensor indicates removal or emptying of a tank below the amount preset as substantially full, there is a gate state change in gate logic 411 that is monitored by a database in local server 413.

When gas cylinders are first loaded into a storage array the type of gas in each row must be identified. The initial mapping of identified storage locations for the diverse gas types is represented by block 416 as information in a memory unit that is sent to local server 413 for communication to remote server 513. The mapping information also contains a pre-defined desired minimum number of gas cylinder tanks of each gas type, forming a threshold number.

Local reporting to the local server may be from the array by a local wire network or a wireless network. The local server 413 reports the sensor array state to a remote server 513, via the Internet or a private line. The remote server 513 tracks similar information from other tank storage units or tank farms 415.

A weight sensor that changes logic state upon removal of a tank from the weight sensor and presumably from the array represents a change in the state of a tank array that is first reported to the local server 413. Local reporting may be by a local wire network or a wireless network. The local server 413, in turn, reports the sensor array state to a remote server 513, via the Internet or a private line. The remote server 513 tracks similar information from other tank storage units or tank farms 415.

Remote server 513 has a database of tanks associated with logic states from all connected tank storage units reporting through local servers to the remote server. This database is used by tank management and supply software 515 that handles ordering, purchasing, stocking, and location of replacement tanks. In turn, the tank management supply module 515 is connected to a route management module 517 that optimizes delivery of replacement tanks. Both tank management and supply software and route management software are well known and have been described in many publications.

The remote server 513 transmits video display output that can be an internet website 521 or a cell phone app 523 so that local server databases, i.e. tank inventory at a tank farm, can be graphically shown to users. Tank management supply software 515 and route management software 517 also communicate with the remote server for display of information through the website and the cell phone app.

In operation, if there has been no change in the initial sensor array state from a tank storage unit, no replacement tanks are needed for that location and such information can be displayed on a website or a cell phone app. On the other hand, if the weight sensor array state from a tank storage unit shows that two sensors in a row of an array have changed from a first logic state to a second logic state, it is assumed that two replacement tanks of the type stored in that row are now needed but not ordered until a threshold level for that row is reached. At that time an order is placed for all tanks to be replaced in the array, including tanks in rows where the threshold has not been reached. The order placement is confirmed by the remote server to a local server and then to the website or cell phone app. Replacement tank procurement is handled by the tank management and supply software 515 and delivery is handled by the route management software 517, with status communicated to local servers via a website or cell phone app. A customer at a local server can interact with the tank management and supply software 515 by changing the threshold for tanks in a particular row. In this manner, tank inventory and ordering are facilitated by the tank sensor array of the present invention with weight sensors associated with storage locations.

What is claimed is:

1. A gas cylinder inventory signaling and ordering system comprising:
    a plurality of gas cylinder tanks in defined storage locations forming an array of gas cylinder tanks at a tank farm, the array having a pre-defined desired minimum number of gas cylinder tanks forming a threshold amount;
    a tank weight sensor associated with each storage location, the sensor generating a first logic signal indicating presence of a substantially full tank of gas or a second logic signal that is the opposite of the first logic signal indicating absence of a substantially full tank of gas, the totality of said first and second logic signals of the plurality of gas cylinder tanks forming a tank inventory at the tank farm wherein a substantially full tank has an amount of gas by weight that is within a specified percentage of a maximum amount by weight of a specific gas intended for the tank;
    a networked local server in communication with the tank weight sensors of the array periodically receiving the tank inventory at the tank farm; and
    a remote server in communication with the local server receiving the tank inventory at the tank farm and having tank management software that orders replacement gas cylinder tanks when the tank inventory at the tank farm is below the threshold amount.

2. The apparatus of claim 1 further comprising at least one mobile computer device in communication with the remote server displaying the tank inventory at the tank farm and orders of replacement gas cylinder tanks.

3. The apparatus of claim 2 wherein the mobile computer device has a communications link with the tank farm capable of setting the threshold amount.

4. The apparatus of claim 1 wherein the tank weight sensor comprises a pair of spaced apart left and right rails supporting a horizontally disposed gas cylinder tank between the rails defining a storage location in an array of similar locations, each rail having an embedded weight sensing switch, the weight sensing switches of left and right rails operating in tandem for generating the first and second logic signals.

5. The apparatus of claim 4 wherein said gas cylinder tank is a propane cylinder and the spacing of left and right rails is less than the diameter of the propane cylinder for propane cylinder support.

6. The apparatus of claim 1 wherein the storage locations comprise spots on rigid material having embedded tank weight sensors, the spots within a square large enough to situate a gas storage tank.

7. The apparatus of claim 1 wherein the storage locations comprise spots on non-rigid material atop rigid material with weight sensors therebetween.

8. The apparatus of claim 1 wherein the weight sensors report the first and second logic signals to gate logic.

9. The apparatus of claim 1 further comprising a memory unit holding initial mapping of identified storage locations for diverse gas types in gas cylinders in the storage array, the memory unit communicating with the local server.

10. The apparatus of claim 9 wherein the memory unit holds the threshold amount of each gas.

11. A gas cylinder inventory signaling and ordering system comprising:
a plurality of horizontally disposed gas cylinder tanks in defined storage locations on spaced-apart rails forming an array of gas cylinder tanks at a tank farm, the array having a pre-defined desired minimum number of gas cylinder tanks forming a threshold amount;
a tank weight sensor associated with each storage location, the sensor generating a first logic signal indicating presence of a substantially full tank of gas and a second logic signal that is the opposite of the first logic signal indicating absence of a substantially full tank of gas, the totality of said first and second logic signals of the plurality of gas cylinder tanks forming a tank inventory at the tank farm wherein a substantially full tank has an amount of gas by weight that is within a specified percentage of a maximum amount by weight of a specific gas intended for the tank;
a networked local server in communication with the tank weight sensors of the array periodically receiving the tank inventory at the tank farm; and
a remote server in communication with the local server receiving the tank inventory at the tank farm and having tank management software that orders replacement gas cylinder tanks when the tank inventory at the tank farm is below the threshold amount.

12. The apparatus of claim 11 wherein each tank weight sensor comprises at least one switch embedded in a rail.

13. The apparatus of claim 11 wherein each tank weight sensor comprises a pair of calibrated switches operating in tandem.

14. The apparatus of claim 13 wherein the pair of calibrated switches has means for signaling a substantially full tank on the rails, a tank that is not substantially full on the rails and a storage array location with no tank.

15. The apparatus of claim 11 wherein the storage locations comprise an upright rack with gas cylinder localization at least partly established by said spaced-apart rails.

16. The apparatus of claim 15 wherein each tank weight sensor comprises a calibrated switch in each of said spaced-apart rails.

17. The apparatus of claim 11 wherein at least one of the spaced-apart rail bodies comprises nesting rail members separated by a tank weight sensor.

18. The apparatus of claim 11 wherein the spaced-apart rails comprise nesting rail members separated by calibrated weight switches.

19. A gas cylinder inventory signaling apparatus comprising:
a plurality of horizontally disposed gas cylinder tanks in defined storage locations on spaced-apart rails forming an array of gas cylinder tanks at a tank farm;
a tank weight switch associated with each rail, each switch calibrated with a means for signaling a substantially full tank on the rails, or a tank that is not substantially full on the rails, or a storage array location with no tank;
wherein a pair of switches associated with spaced-apart rails at a tank storage location operate in tandem as a tank weight sensor.

* * * * *